(12) United States Patent
Khintsitskiy et al.

(10) Patent No.: US 9,922,247 B2
(45) Date of Patent: Mar. 20, 2018

(54) COMPARING DOCUMENTS USING A TRUSTED SOURCE

(71) Applicant: ABBYY Development LLC, Moscow (RU)

(72) Inventors: Ivan Khintsitskiy, Moscow (RU); Andrey Isaev, Moscow region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 125 days.

(21) Appl. No.: 14/588,670

(22) Filed: Jan. 2, 2015

(65) Prior Publication Data

US 2015/0169951 A1 Jun. 18, 2015

Related U.S. Application Data

(63) Continuation-in-part of application No. 14/559,078, filed on Dec. 3, 2014.

(30) Foreign Application Priority Data

Dec. 18, 2013 (RU) .................................. 2013156257
Jun. 11, 2014 (RU) .................................. 2014144496

(51) Int. Cl.
*G06K 9/18* (2006.01)
*G06K 9/00* (2006.01)

(52) U.S. Cl.
CPC ..... *G06K 9/00483* (2013.01); *G06K 2209/01* (2013.01)

(58) Field of Classification Search
None
See application file for complete search history.

(56) References Cited

U.S. PATENT DOCUMENTS

| 8,196,030 | B1 | 6/2012 | Wang et al. | |
| 8,472,726 | B2 | 6/2013 | Gronau et al. | |
| 8,880,540 | B1* | 11/2014 | Sampson | G06K 9/00463 707/756 |
| 2004/0220898 | A1* | 11/2004 | Eguchi | G06F 17/30259 |
| 2004/0220962 | A1* | 11/2004 | Kaneda | G06F 17/30253 |
| 2004/0223648 | A1 | 11/2004 | Hoene et al. | |
| 2005/0289182 | A1* | 12/2005 | Pandian | G06K 9/00442 |
| 2007/0211942 | A1* | 9/2007 | Curtis | G06K 9/6292 382/181 |
| 2007/0237427 | A1* | 10/2007 | Patel | G06K 9/00442 382/305 |
| 2009/0028392 | A1 | 1/2009 | Ramachandrula et al. | |
| 2009/0092320 | A1* | 4/2009 | Berard | G06K 9/00442 382/209 |
| 2012/0072859 | A1* | 3/2012 | Wang | G06K 9/00442 715/764 |
| 2012/0134588 | A1* | 5/2012 | Zhang | G06K 9/3275 382/176 |
| 2012/0177291 | A1* | 7/2012 | Gronau | G06K 9/00402 382/190 |

* cited by examiner

*Primary Examiner* — Ryan P Potts
(74) *Attorney, Agent, or Firm* — Lowenstein Sandler LLP (57) ABSTRACT

Systems and methods for enhancing and comparing documents. An example method comprises: comparing document images to identify a first document image of a reference document that corresponds with a second document image of a related document; transforming the second document image based on a layout of the first document image; and performing character recognition of the second document image.

20 Claims, 6 Drawing Sheets

COMPARING DOCUMENTS USING A TRUSTED SOURCE

CROSS REFERENCE TO RELATED APPLICATIONS

This application is a continuation-in-part of U.S. patent application Ser. No. 14/559,078, filed Dec. 3, 2014. This application also claims the benefit of priority to Russian Patent Application No. 2013156257, filed on Dec. 18, 2013 and to Russian Patent Application No. 2014144496, filed Jun. 11, 2014; the entire disclosures of the priority claims are incorporated herein by reference in their entirety.

TECHNICAL FIELD

The present disclosure is generally related to computing devices for processing electronic documents and more specifically for comparing and enhancing documents.

BACKGROUND

In document flow, records management, and many aspects of conducting business, one may encounter the task of comparing two or more documents that contain text or other information to determine whether they are identical or to find differences in the documents examined. This often includes producing an electronic document by scanning or otherwise acquiring an image of a paper document and performing optical character recognition (OCR) to produce the text associated with the document. When comparing documents there are often false differences, which occur not because of actual differences in the documents but because of inaccuracies in the character recognition procedure.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

The present disclosure relates to methods and systems of comparing documents using a reference document. Further mention of the term "document" in the description of the invention refers to an electronic document that may generated by, for example, digitizing paper-based document, containing an electronic image of the paper document. Described below processing of documents refers to processing of document images. The reference document may represent an initial or earlier version of a document and may be considered a trusted source because it may include a high-quality text layer with little to no visual artifacts that adversely affect character recognition (OCR). The document comparison system may use the reference document to generate reference dictionaries and transform the layout of a related document. Each reference dictionary includes a list of words from a specific part of the document (e.g., text block, page). The reference dictionaries and the layout transformation may be used to enhance the quality of the character recognition procedure. This may reduce the quantity of false differences, which may occur because of inaccuracies in character recognition, as opposed to actual differences in the documents.

The document comparison system may transform the layout of the related document based on comparing its layout with the layout of the reference document. Comparing the layouts may involve selecting reference points on each document based on image landmarks (e.g., words, objects) and processing the reference points to determine an image transformation. The document comparison system may then transform (e.g., using a linear transformation) the related document to correct distortions and restore its layout.

In one example, the reference document may be a legal contract that was drafted in an electronic text format and subsequently converted to a portable document format (PDF). The related document may be a version of the legal contract that was modified, printed, signed and scanned. Scanning the document may have altered the document by introducing, for example, a perspective distortion. This distortion may adversely affect character recognition and may result in recognition mistakes. The method disclosed introduces an iterative comparison, which may include multiple character recognition operations and a document transformation to help reduce the quantity of false differences.

Various aspects of the above referenced methods and systems are described in details herein below by way of examples, rather than by way of limitation.

Figure 1:
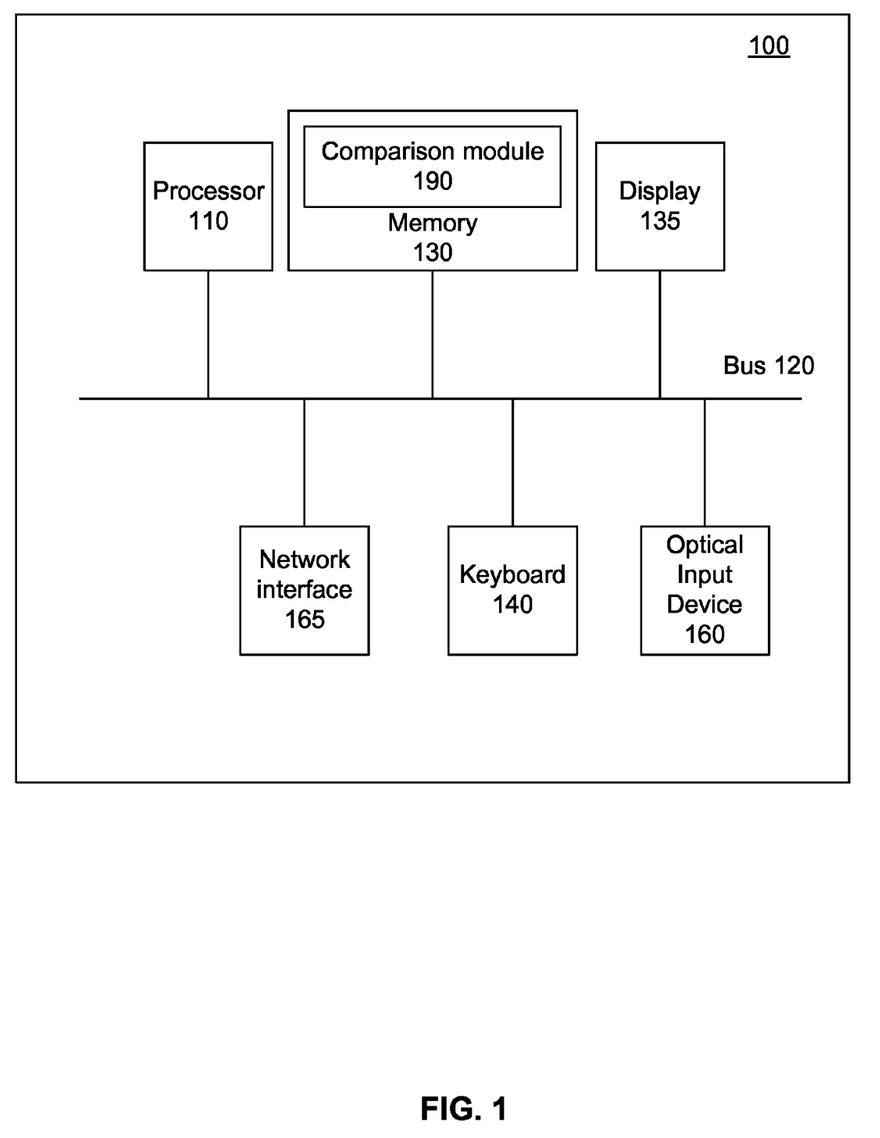
FIG. 1 depicts a block diagram of one embodiment of a computing device operating in accordance with one or more aspects of the present disclosure.

FIG. 1 depicts a block diagram of one illustrative example of a computing device 100 operating in accordance with one or more aspects of the present disclosure. In illustrative examples, computing device 100 may be provided by various computing devices including a tablet computer, a smart phone, a notebook computer, or a desktop computer.

Computing device 100 may comprise a processor 110 coupled to a system bus 120. Other devices coupled to system bus 120 may include a memory 130, a display 135, a keyboard 140, an optical input device 160, and one or more network interfaces 165. The term "coupled" herein shall refer to being electrically connected and/or communicatively coupled via one or more interface devices, adapters and the like.

In various illustrative examples, processor 110 may be provided by one or more processing devices, such as general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 160 may be provided by a scanner or a still image camera configured to acquire the light reflected by the objects situated within its field of view. An example of a computing device implementing aspects of the present disclosure will be discussed in more detail below with reference to FIG. 6.

Memory 130 may store instructions of comparison module 190 for performing optical character recognition. In certain implementations, comparison module 190 may perform methods of comparing and transforming documents in accordance with one or more aspects of the present disclosure. In an illustrative example, comparison module 190 may be implemented as a function to be invoked via a user interface of another application. Alternatively, comparison module 190 may be implemented as a standalone application. In one example, memory 130 may store multiple separate document that are subsequently compared.

Figure 2:
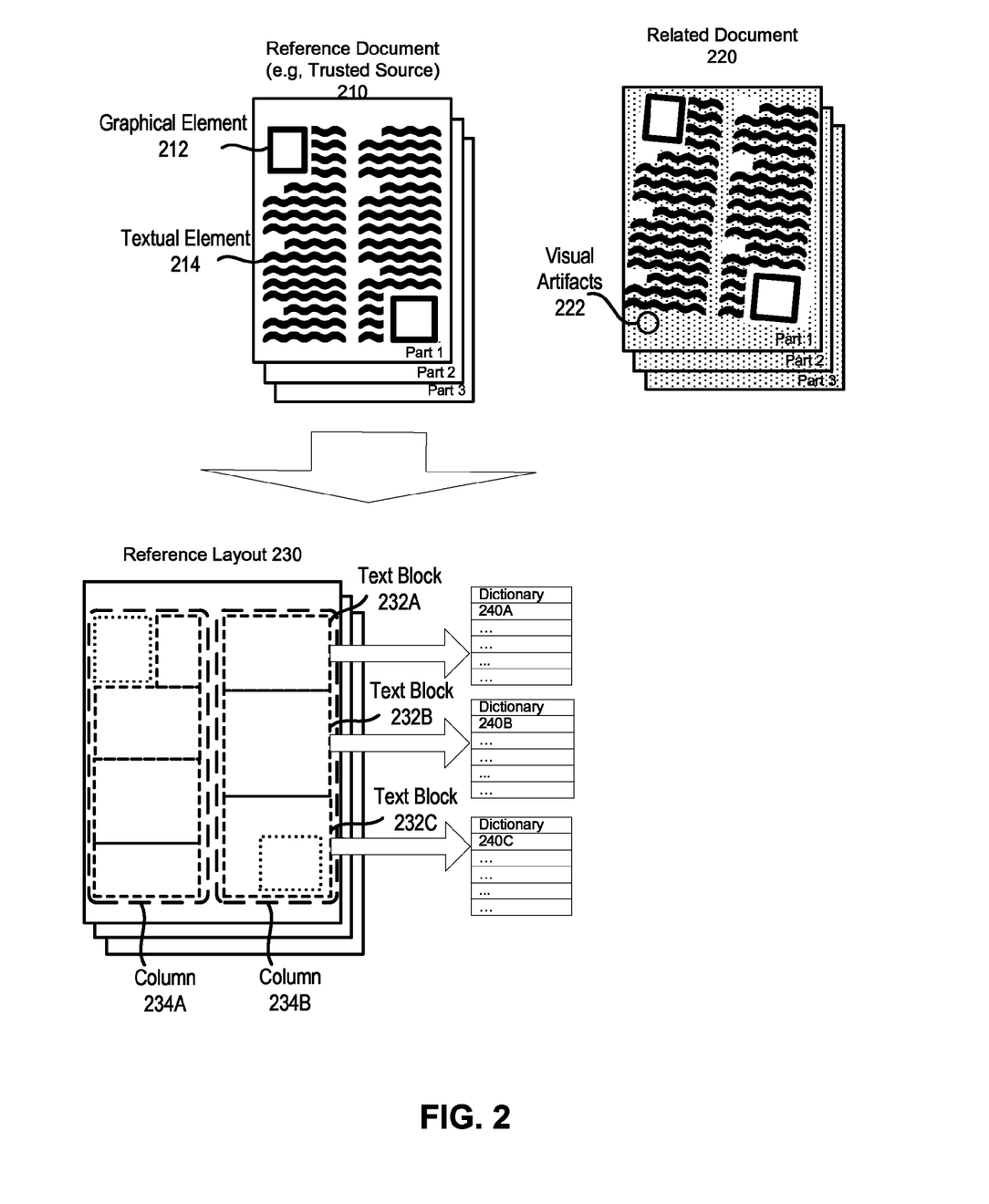
FIG. 2 illustrates an example of a reference document and a related document, in accordance with one or more aspects of the present disclosure.

FIG. 2 illustrates an example of reference document 210 and related document 220, which may be compared to one another using comparison module 190 running on computing device 100 in accordance with one or more aspects of the present disclosure. Reference document 210 may have graphical element 212 and textual element 214 and related document may include similar graphical elements and textual elements, which may have been distorted when the document was digitized (e.g. scanned or imaged). The distortions may include, for example, a shift or rotation and/or the presence of visual artifacts 222, such as sparse light and dark disturbances (e.g., salt and pepper noise or Gaussian noise).

Reference document 210 and related document 220 may be similar to one another, for example, related document 220 may be a different version (e.g., earlier or later) of reference document 210. Reference document 210 may be a trusted source in that it may have a text layer and a document layout that has a higher quality with less visual artifacts 222 than related document 210. Visual artifacts 222 may include noise pollution (e.g., salt and pepper image noise), distortions, defocus, glare, and/or smudge. In one example, reference document 210 may be a digitized document with high image quality and fidelity and minimal amount of visual artifacts. In another example, reference document 210 may be a fixed layout document (e.g., PDF, TIFF) electronically converted from a modifiable layout document (e.g., DOC, ODF, RTF, TXT) without being digitized. The electronic conversion may include converting vector graphics into a raster image (e.g., pixels or dots) for subsequent digital image processing, for example, similar to rasterization or ray tracing.

As shown in FIG. 2, comparison module may perform document analysis and OCR procedures to evaluate reference document 210 and determine a reference layout 230 and reference dictionaries 240A-C. The document analysis may determine reference layout 230, which may comprise the locations (e.g., coordinates), dimensions and arrangements of document elements, such as, graphical element 212 and textual element 214. The arrangement of the elements may include text blocks 232A-C, columns 234A-B and may also include tables, headings, footers, and other similar layout elements. In one example, the reference layout 230 and reference dictionaries 240A-C are constructed for each document image (e.g., page of the reference document).

Reference dictionaries 240A-C may be constructed based on the results of the OCR procedures and/or document analysis. The reference dictionaries 240A-C may include a list of words contained within one or more parts of reference document 210 and may be used to enhance and/or validate the optical character recognition of related document 220. Each dictionary may include a word list that includes words from only a specific part (e.g., page, text block) of the reference document. As shown in FIG. 2, reference dictionaries 240A-C may each include a list of words from text blocks 232A-C respectively. In another example, the reference dictionary may be specific to a single page, column, table, paragraph, cell or other similar portion of the document.

In an alternative, the reference dictionaries 240A-C may include a character set (e.g., alphabet, numerals, symbols). The character set may be derived from the results of the OCR procedures and/or document analysis and may be limited to only those characters present in a specific part of reference document 210. This may be useful for second optical recognition of document images that include, for example, Chinese, Japanese and/or Korean characters (CJK symbols), because the limited character set may include only a subset of all characters, for example 200 characters of the 40,000 available characters. The characters included within the limited character set may be encoded using any standard text encoding, such as Unicode (e.g., UTF-8, UTF-16), ASCII, Shift-JIS or other similar text encoding.

In one example, reference dictionaries 240A-C may include the limited word list and the limited character set, both of which may be generated based on a specific part of reference document image. These may be used to enhance a subsequent (e.g., second) character recognition procedure of related document 220.

Figure 3:
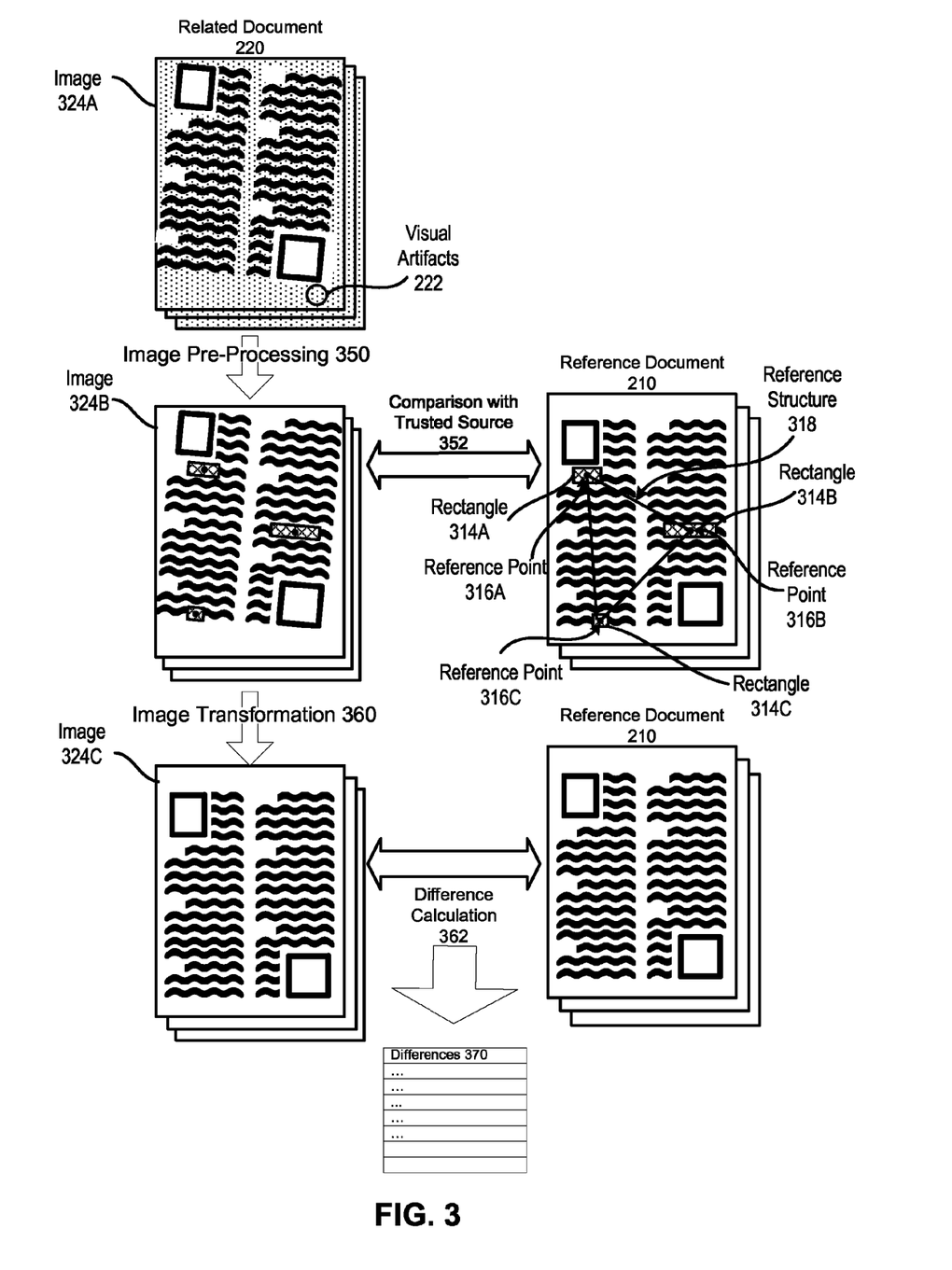
FIG. 3 illustrates examples of document enhancements, in accordance with one or more aspects of the present disclosure.

FIG. 3 is an exemplary illustration of an enhancement and comparison procedure and includes related document 220, which is represented by images 324A-C at different phases of the enhancement procedure. The enhancement procedure may include image pre-processing 350, comparison 352, and image transformation 360 and difference calculation 362.

Image pre-processing 350 may modify image 324A to produce image 324B by performing one or more digital image processing steps to enhance the quality of the image. This may include binarization, noise reduction and/or other similar image processing techniques. Binarization may modify the image and reduce it to a binary image (e.g., bi-level image, two-level image), so that there are only two color values used for each pixel, typically black and white. Image binarization may be performed on grey-scale images or color images and may be performed using a technique, such as, image thresholding.

Image thresholding may involve setting threshold values for a pixel or group of pixels and evaluating the pixel values to determine which of two values will be assigned to that pixel. In one example, Otsu's algorithm may be used to perform clustering-based image thresholding. This algorithm may calculate the optimum threshold value separating the multiple classes so that their combined spread (intra-class variance) is minimal. This may also be used to perform multi-level thresholding via the multi Otsu algorithm.

Image pre-processing 350 may also include noise reduction, which may involve removing and/or reducing visual artifacts 222. Noise reduction may be performed using a noise reduction technique such as linear or non-linear smoothing filters and/or anisotropic diffusion. Some other image pre-processing techniques may include, image de-speckling, texture filtering, clipping page margins, de-skewing, modifying page orientation, straightening lines, correcting perspective, removing motion blur, splitting horizontally adjacent, splitting scanned page with multiple slides or business cards into separate images and/or other similar techniques.

When the image pre-processing 350 has completed, computing device 100 may perform analysis to detect the layout and/or text of related document 220. The analysis may be performed in multiple stages, one stage may include document analysis to detect a layout and another stage may include performing OCR. The OCR stage may utilize the layout detected by the document analysis to recognize text. In one example, the document analysis may be performed first and once the document analysis has completed the OCR stage may be performed and in another example, they may be performed in parallel.

The analysis may be done using any document analysis tool or character recognition techniques. In one example, the document analysis may generate hypotheses with respect to the layout of the original document. The hypotheses may include one or more hypotheses with respect to classification and/or attributes of various document elements comprised by one or more areas (e.g., rectangular blocks) within the document. For example, with respect to a particular area within the document, the OCR system tests the following hypotheses: the area comprises text; the area comprises a picture; the area comprises a table; the area comprises a diagram; and the area comprises a screenshot image. Documents analysis tools and the OCR techniques may then select the best hypothesis in order to produce the layout of the document.

Computing device 100 may also perform a comparison 352 between related document 220 and reference document 210 (e.g., trusted source) to identify corresponding images (e.g., corresponding pages). The comparison may be an iterative comparison that may compare the layouts and/or the text of the documents. Comparing the layouts may include analyzing the similarities and differences of quantity, position, dimensions, and/or arrangements of parts. For example, as shown in FIG. 3, when comparing related document 220 and reference document 210 the computing device may determine that the images have the same quantity of graphical elements and textual elements and these elements have similar dimensions and arrangement (location). It may also analyze the arrangement and determine that the graphical elements are in the same location relative to the paragraphs, namely embedded in the first and last paragraphs of the page.

Comparison 352 may also analyze the text produced by the character recognition discussed above to detect corresponding document images. The textual analysis may be based on a technique that detects the degree of similarity between the character strings of each document image, for example, by determining the quantity of character strings (e.g., words) that match and/or the quantity of strings that do not match. The term "corresponding images" may mean that the document images are an approximately match without being an exact match. In one example, corresponding images may have the same or a similar quantity of elements. The elements may include words, text blocks, picture blocks etc. In another example, corresponding images may be those images that have more than a certain ratio of matching (e.g., corresponding, related) words. The technique to determine matching words may include calculating and comparing the edit distance of word pairs, such as techniques such as approximate string matching or fuzzy string matching.

The edit distance may be an integer value that quantifies how dissimilar two strings are to one another. The edit distance value may be derived by counting the minimum number of operations required to transform one character string into the other character string. The edit distance may be calculated using any technique, such as Levenshtein distance. Levenshtein distance may calculate the edit distance by measuring the number of single character edits required to change one word into another word. In one example, Levenshtein distance may measure only the following operations: removal of a single character; insertion of a single character; and the substitution of one character for another, without taking into account other operations such as transposition of two adjacent characters.

A pair of words may be considered a match if the edit distance is below a threshold value, which may be determined based on a relative limit, an absolute limit or a combination of both. The relative limit may be based on the length of the search word and may be represented as a ratio of edit distance to string length, such as 1:N, wherein N is a number of characters (e.g., 2, 3, 4 5) in the word. In one example, the relative limit may be a ratio of 1:3 of the length of the search word, such that a word with nine characters can have three errors and still be considered an approximate match. In addition to the relative limit, or as an alternative, there may be an absolute limit on dissimilarities regardless of the string length. For example, if there are more than X differences the word pair may not be considered a match. In this case, X may be a value between 1 and 10, such as 3 and may be based on empirical analysis.

The computing device may utilize the approximate string matching discussed above to generate a similarity hypothesis as to whether the images of separate documents are corresponding images, for example are they related or similar to each other (e.g., one is a later version of another, or both have a common ancestor). The similarity hypothesis may be based on the quantity of words that match and/or the quantity of words that do not match as calculated above. Similar to the word matching, image matching (correspondence level) may also have a threshold value. The threshold may set a limit as the quantity or percentage of matching words used to determine if document images match (correspond). In one example, the hypothesis may be based on only a portion of the words in the image, such as only long words, as opposed to every word of the image. Long words may be words with more than a predetermined quantity of characters (e.g., 3, 4, 5 characters). Basing the comparison on long words may avoid many of the false differences that occur more often with short words.

Once computing device 100 detects corresponding images in reference document, it may proceed to calculate a layout transformation function by identifying reference points within each of the corresponding images. In one example, the computing device may determine the reference points at runtime by identifying image landmarks, such as a certain word or word combination. The words or word combination may be unique because they appear once on each of the corresponding images and thus may be useful for aligning corresponding images.

When using words as image landmarks the reference points may be at the center of the words. The computing device may approximate the center of a word by determining the rectangular dimensions of the word and using the center of the rectangular dimensions as the reference point. In one example, the OCR procedure may provide the computing device with coordinates of the rectangles which include (e.g., encompass) the word. As shown in FIG. 3, computing device 100 may analyze reference document 210 and identify three unique (or the longest) words to function as the image landmarks, which are represented by rectangles 314A-C. At the center of the rectangles are the reference points 316A-C respectively.

The computing device may determine that a pair of corresponding images may have multiple unique image landmarks and thus multiple options for reference points. Reference points may be identified using absolute or relative coordinates and define two-dimensional plane using three points that do not lie on the same line. The points may define a reference structure triangle, such as reference structure 318 defined by reference points 316A-C.

When selecting amongst multiple possible reference points the computing device may choose the reference points that are the most distant from one another. Using points that are distant from one another may allow the transformation to be more resistant to errors that arise because of the granularity of the coordinate system and thus the distant points may increase the accuracy of the transformation. Determining the points that are the most distant may be based on selecting a set of reference points from among the several candidate reference points that define a reference structure 318 having the maximum size (e.g., largest area and/or largest perimeter).

The set of reference points 316A-C of reference document 210 may have a corresponding set of reference point on related document 220. The two sets of reference points may be compared to determine a linear or geometric transformation function. The transformation function may comprise a system of linear and/or geometric equations, which may be summarized by a transformation matrix (e.g., 2×2 matrix).

Below is an example linear transformation equation:

$$\begin{bmatrix} a_{11} & a_{12} \\ a_{21} & a_{22} \end{bmatrix} \begin{bmatrix} x_1 & y_1 & z_1 \\ x_2 & y_2 & z_2 \end{bmatrix} = \begin{bmatrix} x'_1 & y'_1 & z'_1 \\ x'_2 & y'_2 & z'_2 \end{bmatrix}$$

Equation of linear transformation $$A = \begin{bmatrix} a_{11} & a_{12} \\ a_{21} & a_{22} \end{bmatrix}$$ matrix of linear transformation;

$\vec{x}=(x_1; x_2)$—coordinates of reference point X within the reference document image;

$\vec{y}=(y_1; y_2)$—coordinates of reference point Y within the reference document image;

$\vec{z}=(z_1; z_2)$—coordinates of reference point Z within the reference document image;

$\vec{x}'=(x_1'; x_2')$—coordinates of reference point X' within the related image;

$\vec{y}'=(y_1'; y_2')$—coordinates of reference point Y' within the related image;

$\vec{z}'=(z_1'; z_2')$—coordinates of reference point Z' within the related image;

It comprises two sets of reference points, each set having at least three points. Each reference point may include at least two coordinates, for example $\vec{x}=(x_1; x_2)$. The coordinates may be based on any coordinate system that can function to identify a point in two dimensional space, for example a Cartesian coordinate system or polar coordinate system.

Once the transformation function has been identified, computing device 100 may perform image transformation 360, which may apply the image transformation function to modify the layout, text and/or graphics of related document 220 in accordance with a layout of the reference document image. As shown in FIG. 3, image transformation 360 may modify image 324B by rotating the text and graphics 5 degrees counter-clockwise and shifting them down, resulting in image 324C.

After applying the transformation function, computing device 100 may perform a quality check of the results of the image transformation. This may include selecting an additional set of reference points from reference document 210 that are different then the first set of reference points. Based on these new points, computing device 100 may select corresponding points on related document 220 and transform the image using the previous transformation function. If the resulting points in the related image are within a threshold distance from the corresponding image landmark, for example, within the rectangle encompassing word or in close proximity to the rectangle, the transformation function may determine the transformation function is correct. Otherwise, it may determine the transformation function to be incorrect.

When the transformation function is determined to be incorrect, a new set of image landmarks may be selected. The above procedures may be repeated using a new set of reference points derived from the new landmarks. This may include determining, applying, and checking multiple new transformation functions until a correct transformation function is detected or the number of failed attempts has reached a threshold (e.g., 2, 3, 4, 5 or greater attempts).

After determining the results of the image transformation are correct, computing device 100 may re-run a character recognition procedure (e.g., OCR) on the transformed version of the related document 220. The second character recognition may produce text results that have less recognition based in-accuracies. These results may replace the results of the first character recognition and be used for subsequent difference calculation 362.

The process of comparing and transforming steps may be iterative. In one example, the computing device may iterate through a multi-part document image-by-image (page-by-page), which may involve selecting an image from each document and comparing them and then proceeding to another image from each document and comparing them. If the image has a match (corresponding image) it may proceed to transform it and re-run the character recognition, if it does not have a match (corresponding image) it may skip the transformation and second character recognition steps and begin calculating, filtering and classifying the differences (based on the result of first stage character recognition) as discussed in more detail below. In another example, the iterative comparison may include selecting an image (e.g. page) from either the related document 220 or reference document 210 and consecutively comparing it to multiple images (e.g. page) of the other document until either a match is found or the images (e.g. page) of the other document are exhausted, at which point it would proceed to the next part and perform a similar series of comparisons.

Figure 4:
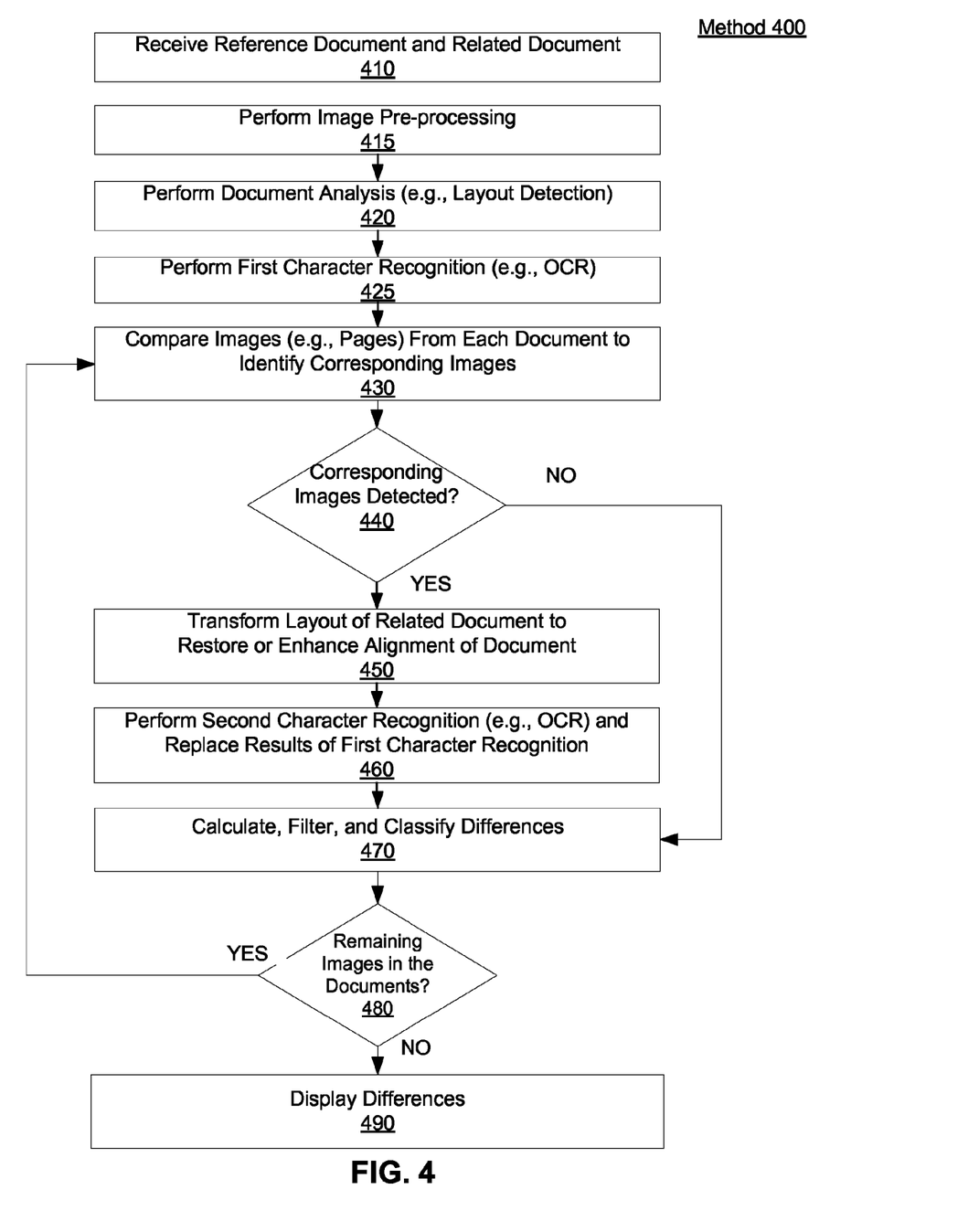
FIG. 4 depicts a flow diagram of one illustrative example of a method 400 for enhancing and comparing documents, in accordance with one or more aspects of the present disclosure.

FIG. 4 depicts a flow diagram of one illustrative example of a method 400 for processing electronic documents, in accordance with one or more aspects of the present disclosure. Method 400 and/or each of its individual functions, routines, subroutines, or operations may be performed by one or more processors of the computer device (e.g., computing device 100 of FIG. 1) and/or each of its individual functions, routines, subroutines, or operations may be performed by one or more processors of the computer device (e.g., computing device 100 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the worker processes or processing threads implementing method 400 may be synchronized (e.g., using semaphores, critical sections, and/or other thread synchronization mechanisms).

At block 410, computing device 100 may receive multiple electronic documents, for example reference documents 210 and related documents 220. Documents 210 and 220 may be from different sources and stored in different locations. In one example, the user may manually choose documents 210 and 220 by providing location information to computing device 100. In another example, computing device 100 may automatically receive a related document from a digitization device (e.g., scanner) without the user providing location information and may subsequently fetch the appropriate reference document from a document repository automatically using any known classification technique. The document repository may be accessible to the computing device and may be stored on the computing device or a remote device (e.g., company server, third party server).

At block 415, computing device 100 may perform image pre-processing on one or more of the documents to enhance image quality. The computing device may then perform document analysis, as seen at block 420 to detect the layout of a document image, for example the location of text blocks.

At block 425, computing device 100 may also perform a first character recognition procedure. The first character recognition procedure may be performed after the document analysis has completed and may utilize the results of the document analysis to locate portions of the document that may include text. The first character recognition procedure may then analyze these portions to produce text results.

At block 430, computing device 100 may iteratively compare the document images (e.g. pages) to identify corresponding images (e.g. pages). This may be done by selecting an image (e.g., page or portion of a page) from each document and comparing them using, for example, the results of the layout detection and text results of blocks 420 and 425. The comparison may include a textual comparison that calculates the edit distance of multiple word pairs. The comparison may only take into account long words having a quantity of characters over a predetermined number, without taking into account words that are shorter.

At block 440, computing device 100 may determine if the reference document image (e.g. pages) matches the related document image (e.g. pages). Being that the procedure is intended to detect differences, the document images may match approximately as opposed to exactly, as discussed above. If the images do not match then the method branches to block 470 and checks if there are additional images to be compared. Otherwise, the method proceeds to block 450.

At block 450, computing device 100 may transform the images (e.g. pages) of the related document to remove distortions that may have been introduced during digitization. This may include analyzing reference points of both documents to calculate a transformation function and then applying this transformation function to a portion (e.g., page) of the document.

At block 460, the computing device may perform a second character recognition procedure (e.g., re-run character recognition) on the related document using reference dictionaries derived from the reference document (e.g., a dictionary per text block or dictionary per page). The second character recognition may be performed after the transformation of related document 220, as opposed to the first character recognition which is performed before the transformation. The results of the second character recognition may have less in-accuracies when compared to the first character recognition since the transformed document may have less distortions. The computing device may replace the results from the first character recognition procedure of related document image with the results from the second character recognition procedure. Therefore, using these results may produce less false differences.

At block 470, the computing device may calculate the differences and eliminate, filter and classify the remaining differences. Computing device 100 may calculate the differences using a comparison method, such as those used by the UNIX® based diff utility. These differences are not final, and may include one or more further iterations of checks, sorting, and removal of insignificant discrepancies. Some of the difference may be OCR discrepancies from inaccuracies in the OCR-engine and not actual differences between the documents. OCR discrepancies may be caused by defects in the documents being compared, such as in the form of a blur, the text being out of focus (defocused), a glare, or excessive noise. In some embodiments, these defects may be caused by scanning or photographing the text. In one example, OCR discrepancies may be reduced by comparing the strings (e.g., words) that differ in the documents compared. If the characters that differ are graphically similar, then it is very probable that these discrepancies were caused by the peculiarities of recognition. If the discrepancy consists of visually similar characters with different Unicode codes, this discrepancy is also considered insignificant and may not be shown to the user. The following are examples of differences caused by the visual similarity of characters: the letter "O" and the digit zero "0"; differences in alphabets, such as the letters "ABC" in Cyrillic and the similar letters "ABC" in Latin; the differences caused by differing widths of characters, such as dashes and hyphens of various lengths; fixed spacing and ordinary ink objects; fractions in the form of ¾ and ¾, etc.

Once removing the discrepancies the computing device may filter and classify the remaining differences. Filtration of discrepancies is intended to discard differences that are "false" or insignificant whereas classification is used to categorize and clarify the types of changes. Classification of the differences may include, for example, identifying or clustering types of significant changes such as "insert," "deletion," "text change", etc. This may be displayed to the user to allow the user to quickly determine visually which of the types of discrepancies formed are of significance to him or her and which are insubstantial. For example, a discrepancy of the "character X changed to character Y" type may be insignificant for the user, while a discrepancy of the "word A changed to word B" type may be significant. In some embodiments, a list of differences that have been determined to be insignificant may optionally be shown to the user. Such a list may be presented in a different manner (e.g., only displayed upon selection by a user, displayed lower in an interface, etc.) than the list of significant differences. In one example, calculating the differences and eliminating, filtering and classifying the remaining differences may utilize a method described in RU Patent Application number 2013156257 titled "Устройство и Способ Поиска Различий в документах" ("Method and Apparatus for Finding Differences in Documents") the contents of which are incorporated herein by reference.

At block 480, computing device 100 may analyze the document to determine if the documents have additional parts (e.g., images/pages) that have not yet been analyzed. If there are additional images computing device 100 may branch to block 430 to compare another set of pages. If there are no additional images it may proceed to block 490.

At block 490, the remaining differences may be presented to the user as either a modified image with superimposed annotations and/or a text based list of differences. For example, the system may be configured to set up a mode for displaying to the user the results of the comparison conducted. Display of the results of the comparison may also be provided by default in the settings. According to some embodiments, a display function for the user may be chosen for the settings that provides as much comprehensive detail as possible about the results of the analysis done, containing all the differences found, including those caused by inaccurate OCR results. In addition, a user may manually select the types of significant discrepancies that must be included in the final list of discrepancies and those that may be removed from this list. In some embodiments, different variations of the discrepancies found can be established.

The results of the document comparison may be displayed, for example, by displaying the differing areas on a screen or print-out. When a discrepancy is found in the documents, the specific area (text) where this difference is located is color-highlighted. The type of difference found may be signaled to the user with a certain color area. In some embodiments, the color of the area may be provided to the user in advance in the settings. For example, yellow may be the signal that in this area differences of the "deleted" type were found, while red might indicate "inserted", etc. In some exemplary embodiments, if a change is found within a word, the entire word is highlighted in yellow and the changed character in it in red. Various other ways of representing (e.g., visually representing) the differences may be utilized in various exemplary embodiments.

Figure 5:
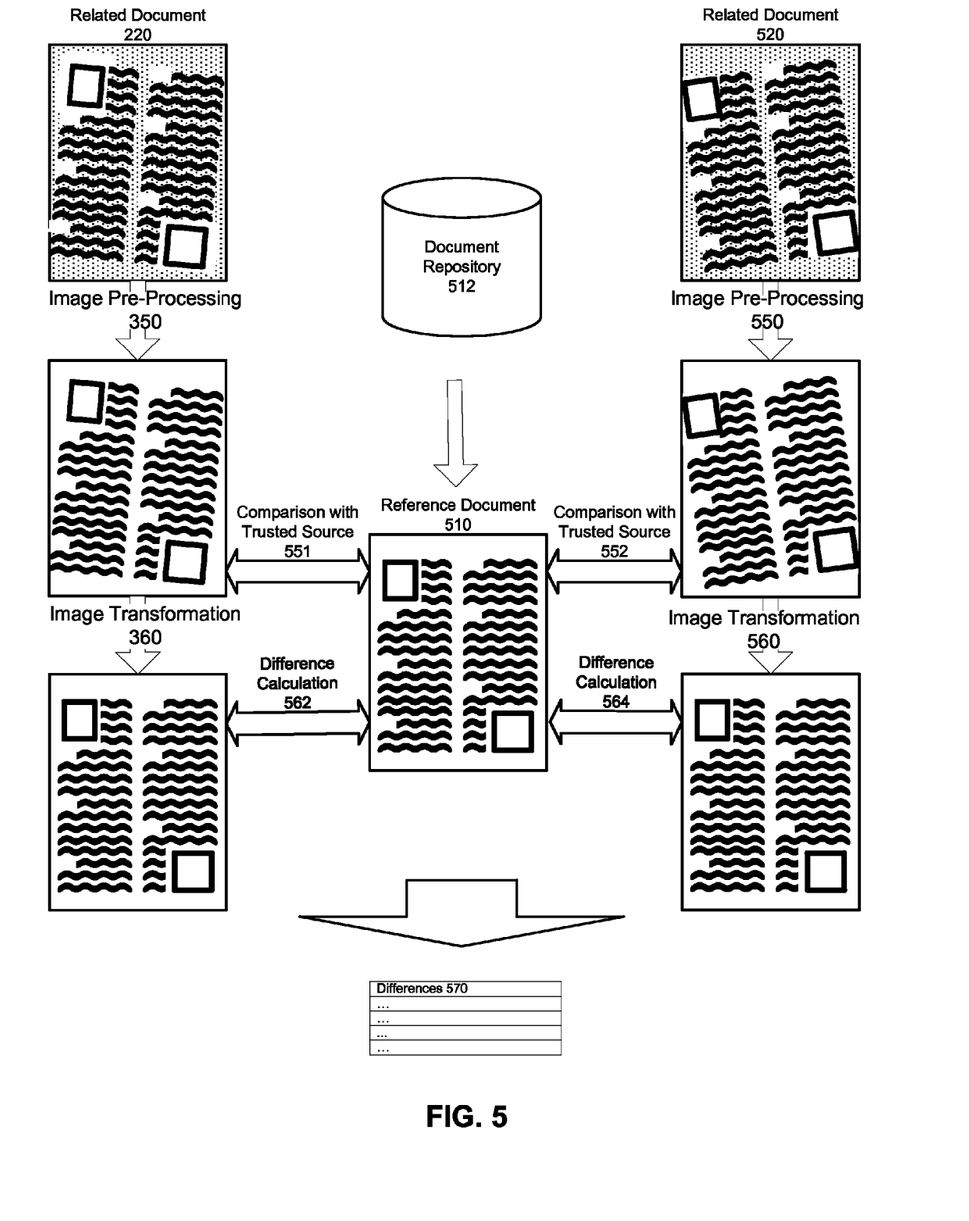
FIG. 5 illustrates an example of enhancing and comparing three documents, in accordance with one or more aspects of the present disclosure.

FIG. 5 is exemplary illustration of a document enhancement and comparison procedure involving three or more documents. In this case, first related document 220, second related document 520 and reference document 510 may be compared to determine differences 570. Computing device 100 may dynamically select reference document 510 from document repository 512 at runtime. The dynamic selection may be based on classifying one or more related documents 220 and 520. As discussed above, reference document 510 may be an earlier version of the document, in which case the classification can be used to determine the original document and/or the version that is most similar (e.g., most recent). In another example, the computing device may not have access to the original document or an earlier version, and may utilize a classification to identify a generic reference document (e.g., template). The generic reference document may be loosely related to the related document in that the related document may not be derived from the generic reference document. Despite this, the generic reference document may have a layout similar to related documents 220 and 520, for example, the generic reference document may be an image of a generic contract, passport, business card, presentation slide, word document, or other similar document. The classification of the related document(s) may be based on any known technique, for example, it may be based on morphological image analysis.

Once reference document 510 has been received the computing device may perform steps similar to those performed on related document 220 in FIG. 3, in addition it may perform the same or substantially similar processing steps on related document 520. The computing device may perform the steps in parallel, for example, image pre-processing 350 and image transformation 360 may be similar to and performed in parallel with image pre-processing 550 and image transformation 560 respectively. Likewise, comparison 551 and difference calculation 562 may be performed in parallel with comparison 552 and difference calculation 564.

In another example that is not shown, reference document 510 may be used to transform related documents 220 and 520 without being used to calculate the differences. Thus, differences 570 may be between the related documents and not between a related document and reference document. In which case, the reference document may be used to transform the images and re-run the OCR but is not needed for any subsequent comparison steps.

Figure 6:
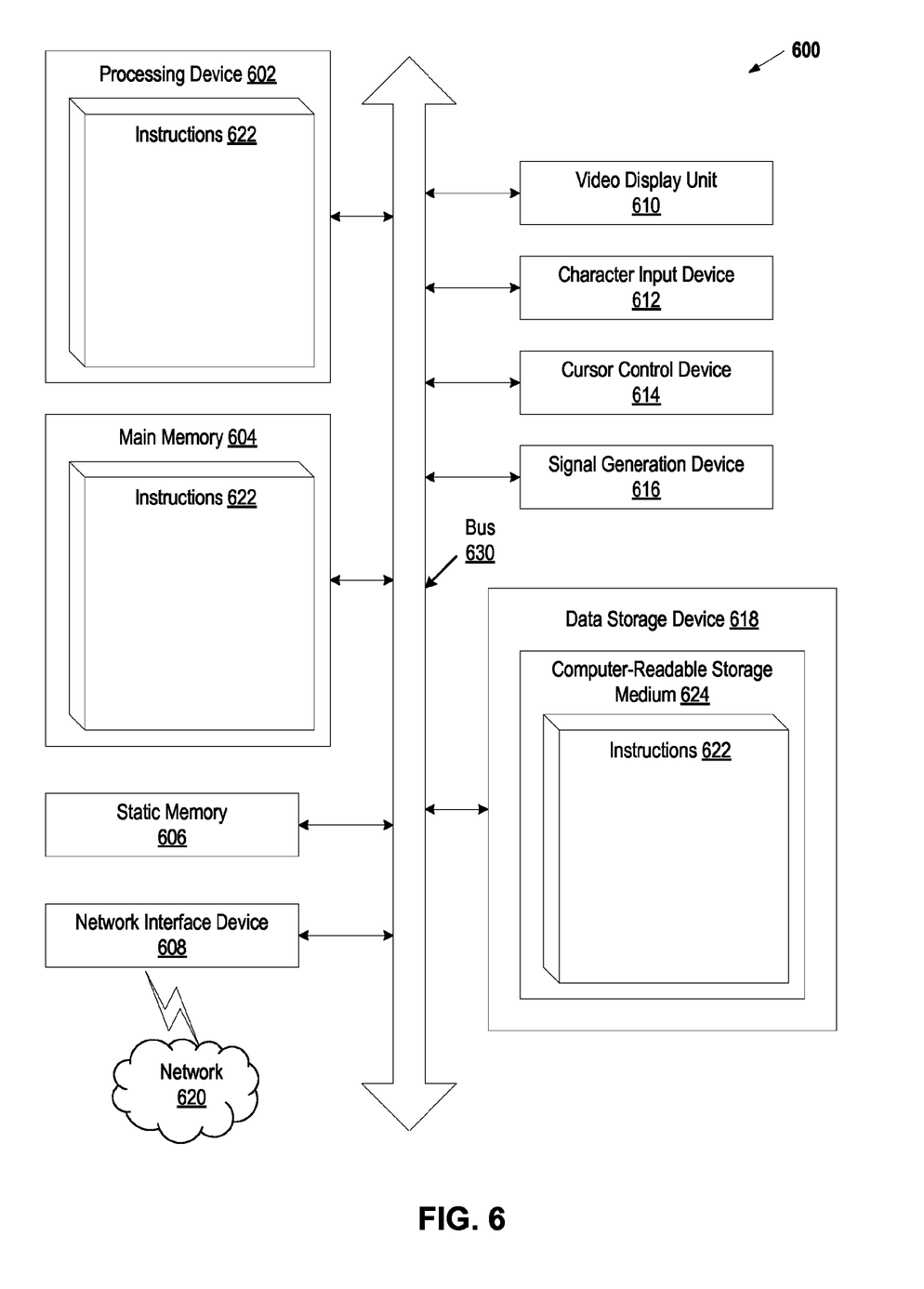
FIG. 6 depicts a more detailed diagram of an illustrative example of a computing device implementing the methods described herein.

FIG. 6 illustrates a more detailed diagram of an example computing device 600 within which a set of instructions, for causing the computing device to perform any one or more of the methods discussed herein, may be executed. The computing device 600 may include the same components as computing device 100 of FIG. 1, as well as some additional or different components, some of which may be optional and not necessary to provide aspects of the present disclosure. The computing device may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 600 includes a processor 602, a main memory 604 (e.g., read-only memory (ROM) or dynamic random access memory (DRAM)), and a data storage device 618, which communicate with each other via a bus 630.

Processor 602 may be represented by one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions 622 for performing the operations and functions discussed herein.

Computing device 600 may further include a network interface device 608, a video display unit 610, an character input device 612 (e.g., a keyboard), a cursor control device 614 and a signal generation device.

Data storage device 618 may include a computer-readable storage medium 624 on which is stored one or more sets of instructions 622 embodying any one or more of the methodologies or functions described herein. Instructions 622 may also reside, completely or at least partially, within main memory 604 and/or within processor 602 during execution thereof by computing device 1000, main memory 604 and processor 602 also constituting computer-readable storage media. Instructions 622 may further be transmitted or received over network 620 via network interface device 608.

In certain implementations, instructions 622 may include instructions of method 400 for enhancing and comparing documents, and may be performed by comparison module 190 of FIG. 1. While computer-readable storage medium 624 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    performing document analysis of a first document image of a related document;
    performing a first character recognition of the first document image;
    comparing the first document image with a second document image of a reference document based on results of the first character recognition;
    transforming the first document image based on the comparison of the first document image and the second document image; and
    performing a second character recognition of the transformed first document image using a reference dictionary generated in view of the reference document.

2. The method of claim 1, further comprising calculating differences between the related document and the reference document based on results of the second character recognition.

3. The method of claim 1, wherein the comparing the first document image with the second document image comprises comparing at least a part of a first layout and at least a part of a first text produced by the first character recognition of the first document image to at least a part of a second layout and at least a part of a second text of the second document image.

4. The method of claim 3, wherein the part of the first text and the part of the second text comprise words having at least a predefined number of characters, and wherein the comparing further comprises calculating an edit distance between corresponding words.

5. The method of claim 1, wherein the first document image comprises an image of a page of a document.

6. The method of claim 1, wherein transforming comprises performing a linear transformation of the second document image based on positions of three points within each of the first document image and the second document image.

7. The method of claim 1, wherein the reference dictionary comprises words from only a specific text block of the second document image.

8. A system comprising:
    a memory;
    a processor coupled to the memory, the processor configured to:
        perform document analysis of a first document image of a related document;

perform a first character recognition of the first document image;

compare the first document image with a second document image of a reference document based on results of the first character recognition;

transform the first document image based on the comparison of the first document image and the second document image; and perform a second character recognition of the transformed first document image using a reference dictionary generated in view of the reference document.

9. The system of claim 8, wherein the processor is further configured to calculate differences between the related document and the reference document based on results of the second character recognition.

10. The system of claim 8, wherein comparing the first document image with the second document image comprises comparing at least a part of a first layout and at least a part of a first text produced by the first character recognition of the first document image to at least a part of a second layout and at least a part of a second text of the second document image.

11. The system of claim 10, wherein the part of the first text and the part of the second text comprise words having at least a predefined number of characters, and wherein the comparing further comprises calculating an edit distance between corresponding words.

12. The system of claim 8, wherein the first document image comprises an image of a page of a document.

13. The system of claim 8, wherein transforming comprises performing a linear transformation of the second document image based on positions of three points within each of the first document image and the second document image.

14. The system of claim 8, wherein the reference dictionary comprises words from only a specific text block of the second document image.

15. A computer-readable non-transitory storage medium comprising executable instructions that, when executed by a computing device, cause the computing device to perform operations comprising:

performing document analysis of a first document image of a related document;

performing a first character recognition of the first document image;

comparing the first document image with a second document image of a reference document based on results of the first character recognition;

transforming the first document image based on the comparison of the first document image and the second document image; and performing a second character recognition of the transformed first document image using a reference dictionary generated in view of the reference document.

16. The computer-readable non-transitory storage medium of claim 15, further comprising calculating differences between the related document and the reference document based on results of the second character recognition.

17. The computer-readable non-transitory storage medium of claim 15, wherein comparing the first document image with the second document image comprises comparing at least a part of a first layout and a part of a first text produced by the first character recognition of the first document image to at least a part of a second layout and a part of a second text of the second document image.

18. The computer-readable non-transitory storage medium of claim 17, wherein the part of the first text and the part of the second text comprise words having at least a predefined number of characters, and wherein the comparing further comprises calculating an edit distance between corresponding words.

19. The computer-readable non-transitory storage medium of claim 15, wherein transforming comprises performing a linear transformation of the second document image based on positions of three points within each of the first document image and the second document image.

20. The computer-readable non-transitory storage medium of claim 15, wherein the reference dictionary comprises words from only a specific text block of the second document image.

* * * * *